May 23, 1967   H. D. HAZZARD   3,321,602
VOLTAGE-SENSITIVE MULTIPLE SWITCH
Filed July 12, 1965
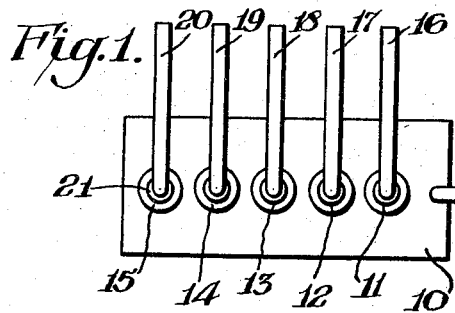
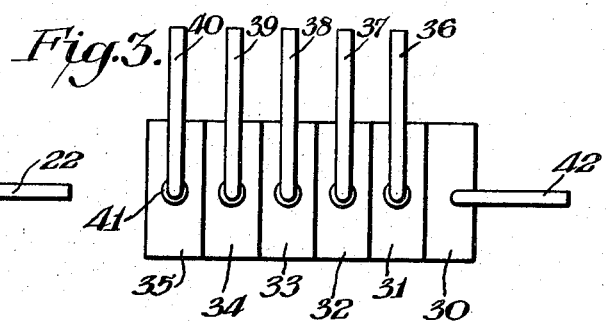
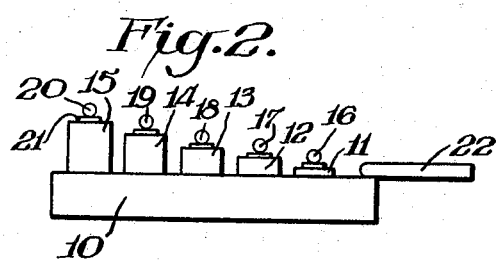
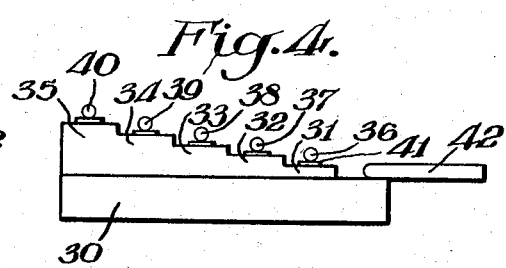
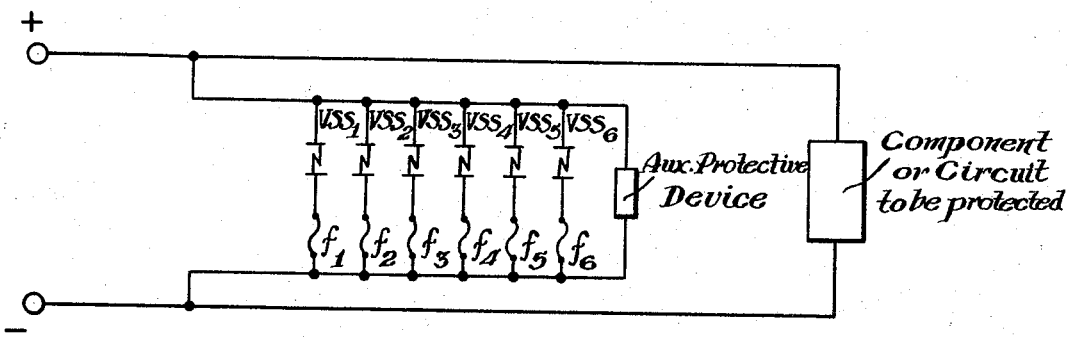
INVENTOR
*Henry D. Hazzard*
BY *Connolly and Hutz*
ATTORNEYS United States Patent Office 3,321,602
Patented May 23, 1967

3,321,602
VOLTAGE-SENSITIVE MULTIPLE SWITCH
Henry D. Hazzard, Williamstown, Mass., assignor to Sprague Electric Company, North Adams, Mass., a corporation of Massachusetts
Filed July 12, 1965, Ser. No. 471,256
5 Claims. (Cl. 200—181)

ABSTRACT OF THE DISCLOSURE

A voltage-sensitive multiple switch is provided by a valve-metal body having a plurality of dielectric oxide areas with progressively higher breakdown voltages. Each of the oxide areas is provided with a fusible conductive contact. A common contact is provided to the valve-metal body.

---

The present invention relates to a protective device for an electrical component or an electrical circuit. More particularly, to a protective device for protecting components or circuits subject to variable voltage conditions.

Individual electrical components usually can withstand moderate overvoltages or large transient voltages, such as 150% of the normal voltage, for short periods of time without damage. They cannot withstand higher surges, such as 250% to 300% of the normal voltage and, therefor, some protection must be afforded them.

A voltage-sensitive switch is described in a paper by K. O. Otley et al. in the Proceedings of the IRE, vol. 46, No. 10, page 1723, Oct. 1958. This switch basically has the structure of a capacitor in that it comprises two conductive layers separated by a dielectric oxide. Unlike a capacitor, however, this unit functions at the voltage at which the dielectric film breaks down. This device is considered primarily a one-time-use switch, since after the breakdown of the dielectric a circuit between the conductive layers or electrodes is closed.

It is an object of the invention to present a novel voltage-sensitive multiple switch.

Another object is to provide a multiple switch capable of protecting a component or circuit a number of times.

Other objects and advantages of the present invention will be made obvious to those skilled in the art by the following description when considered in relation to the accompanying drawing of which:

FIGURE 1 is a plan view of a multiple switch representative of the present invention;
FIGURE 2 is a side view of the multiple switch of FIGURE 1;
FIGURE 3 is a plan view of another multiple switch of the present invention; and
FIGURE 4 is a side view of the multiple switch of FIGURE 3.
FIGURE 5 illustrates circuitry involving the protective device of the present invention.

In accordance with the present invention there is provided a voltage sensitive multiple switch comprising a valve metal body having a plurality of dielectric oxide areas having different breakdown voltages and a fusible conductive contact affixed to each of said areas.

The drawing depicts two representative examples of switches within the scope of the present invention. In FIGURES 1 and 2 a valve metal foil 10 has isolated areas 11, 12, 13, 14 and 15 of anodic oxide formed to progressively higher voltages. Fusible leads 16, 17, 18, 19 and 20 are affixed to the anodized areas via a conductive material 21. A lead 22 is affixed to valve metal foil 10.

FIGURES 3 and 4 illustrate a variation wherein valve metal foil 30 has steps 31, 32, 33, 34 and 35 of anodic oxide formed to progressively higher voltages. Fusible leads 36, 37, 38, 39 and 40 are affixed to the anodic oxide steps via a conductive material 41. A lead 42 is affixed to valve metal foil 30.

The protective device of the present invention finds its utility under the following circumstances: Assume that a circuit or a component can operate below 10.0 volts, but will be put out of commission or destroyed if subjected to a voltage of 10.1 to 15.1 volts for longer than $t$ time. A device as illustrated in FIGURE 1 is employed, said device having a plurality of switches with fusible leads, said switches being designed to operate between 10.1 to 15.1 volts. For example, the device has switches rated at 10.1, 11.1, 12.1, 13.1, 14.1 and 15.1 volts, each having a fusible lead affixed to the anodic oxide dielectric of the switch. This device is placed in parallel with the component or circuit to be protected as shown in FIGURE 5.

If a voltage transient between 10.1 and 11.1 volts occurs, the first voltage sensitive switch ($VSS_1$) will short causing a voltage drop with respect to the component or circuit to be protected and the low impedance resulting will allow current to flow through its fusible lead ($f1$) causing it to fuse open. The fusible lead is so selected that its time to open will be longer than the longest expected transient. A factor to be considered is the available short circuit current. After the fusible wire has opened the component or circuit will return to normal operation until another transient appears in the circuit.

If a voltage transient of 15.1 or greater appears in the circuit, all of the switches $VSS_1$ through $VSS_6$ will short and the resulting low impedance will permit the current flow through $f1-f6$ causing them to open. An auxiliary protective device should be used in series with the voltage sensitive multiple switch so that the component or circuit will be rendered inoperative until the multiple switch is replaced and the auxiliary protective device is reset. A circuit breaker is one example of an auxiliary protective device.

Any of the common valve metals, aluminum, tantalum, niobium, etc.; can be employed herein. The anodic oxide can be formed by means of any of the prior art electrolytes. The oxide isolation pattern of FIGURE 1 or the step-like construction of FIGURE 3 can be accomplished by techniques within the skill of the art.

The specifications for the fusible lead will in general be dictated by the characteristics of the particular component or circuit to be protected and by the current available to fuse open the lead. Nichrome wire is a preferred material, however, other metals can be used to advantage. Nichrome wire is a wire of about 80% nickel and 20% chromium.

Since it is obvious that many changes and modifications can be made in the above-described details without departing from the nature and spirit of the invention, it is to be understood that the invention is not limited to said details except as set forth in the appended claims.

What is claimed is:
1. A voltage sensitive multiple switch comprising a valve metal body having a plurality of dielectric oxide areas having progressively higher breakdown voltages, a fusible conductive contact affixed to each of said areas, and a common conductive contact affixed to said body.

2. The switch of claim 1 wherein the oxide areas are isolated from one another.

3. The switch of claim 1 wherein the oxide areas are of a continuous stepwise profile.

4. The switch of claim 1 wherein the valve metal is aluminum and the fusible conductive contact is nichrome wire.

5. The switch of claim 1 wherein the valve metal is tantalum and the fusible conductive contact is nichrome wire.

References Cited by the Examiner

UNITED STATES PATENTS

| | | | |
|---|---|---|---|
| 1,930,326 | 10/1933 | Thomas | 200—118 |
| 2,081,051 | 5/1937 | Friedrich | 200—118 |
| 2,179,935 | 11/1939 | Kayatt | 200—118 |
| 2,986,660 | 5/1961 | Franklin et al. | 200—126 X |
| 3,205,326 | 9/1965 | Viscosi et al. | 200—118 |

BERNARD A. GILHEANY, *Primary Examiner.*

J. J. BAKER, R. N. ENVALL, Jr., *Assistant Examiners.*